United States Patent
Hallberg

(10) Patent No.: US 9,684,331 B2
(45) Date of Patent: Jun. 20, 2017

(54) VEHICLE PEDAL ASSEMBLY WITH PLASTIC PEDAL SHAFT STRUCTURE

(71) Applicant: Thomas A. Hallberg, Goshen, IN (US)

(72) Inventor: Thomas A. Hallberg, Goshen, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 14/877,384

(22) Filed: Oct. 7, 2015

(65) Prior Publication Data

US 2016/0101694 A1    Apr. 14, 2016

Related U.S. Application Data

(60) Provisional application No. 62/063,302, filed on Oct. 13, 2014.

(51) Int. Cl.
| | |
|---|---|
| G05G 1/30 | (2008.04) |
| G05G 1/44 | (2008.04) |
| B60T 7/04 | (2006.01) |
| B60T 7/06 | (2006.01) |

(52) U.S. Cl.
CPC .................. *G05G 1/44* (2013.01); *B60T 7/04* (2013.01); *B60T 7/042* (2013.01); *B60T 7/06* (2013.01); *G05G 1/30* (2013.01)

(58) Field of Classification Search
CPC . B60K 26/02; B60T 7/04; B60T 7/042; B60T 7/06; G05G 1/30; G05G 1/44; G05G 1/445; F16C 33/24; F16C 2208/66
See application file for complete search history.

(56) References Cited

U.S. PATENT DOCUMENTS

| | | | | |
|---|---|---|---|---|
| 5,697,260 | A * | 12/1997 | Rixon .................. | B60K 26/021 74/513 |
| 5,806,376 | A * | 9/1998 | Papenhagen ........... | B60K 26/02 74/513 |
| 5,855,146 | A * | 1/1999 | Papenhagen ........... | B60K 26/02 74/560 |
| 7,404,342 | B2 | 7/2008 | Wurn | |
| 8,516,922 | B2 * | 8/2013 | Curran .................... | B62M 3/08 74/594.1 |
| 2008/0276749 | A1 | 11/2008 | Stewart et al. | |
| 2010/0206122 | A1 | 8/2010 | Seiltz | |
| 2011/0100153 | A1 | 5/2011 | Kaijala et al. | |
| 2013/0133472 | A1 | 5/2013 | Burguera Albizuri et al. | |

FOREIGN PATENT DOCUMENTS

| | | |
|---|---|---|
| DE | 10039808 A1 | 2/2002 |
| WO | 2011028830 A1 | 3/2011 |

* cited by examiner

*Primary Examiner* — Adam D Rogers
(74) *Attorney, Agent, or Firm* — Daniel Deneufbourg

(57) ABSTRACT

A vehicle pedal assembly with a stationary plastic pedal shaft structure made of different plastic materials and more specifically a vehicle pedal assembly with a pedal shaft including an exterior bearing surface adapted for abutting bearing contact with the surface of the drum of the pedal shaft. The bearing surface is made of a different plastic material that minimizes wear and friction between the shaft surface and the pedal drum surface. The pedal shaft includes opposed key shaped ends that are inserted into respective key hole shaped through-holes defined in the pedal assembly housing for aligning and securing the pedal shaft in the pedal housing.

6 Claims, 4 Drawing Sheets

VEHICLE PEDAL ASSEMBLY WITH PLASTIC PEDAL SHAFT STRUCTURE

CROSS-REFERENCE TO RELATED AND CO-PENDING APPLICATIONS

This application claims the benefit of the filing date and disclosure of U.S. Provisional Patent Application Ser. No. 62/063,302 filed on Oct. 13, 2014 which is incorporated herein by reference as are all references cited therein.

FIELD OF THE INVENTION

This invention pertains generally to a vehicle pedal assembly and, more specifically, to a new pedal shaft structure for such a vehicle pedal assembly.

DESCRIPTION OF THE RELATED ART

The present invention is directed to a vehicle pedal assembly of the type disclosed in for example U.S. Pat. No. 7,404,342 to Wurn and US Patent Application Publication No. US 2008/0276749 A1 to Stewart, the disclosure of which are incorporated herein by reference.

The present invention is directed to a new lower cost pedal shaft structure for such a vehicle pedal assembly.

SUMMARY OF THE INVENTION

The present invention is generally directed to a vehicle pedal assembly comprising a pedal housing including a pair of side walls defining a pair of respective through-holes, a rotatable pedal including a drum extending into the pedal housing, the drum defining a through-hole, and a stationary pedal shaft extending through the through-hole defined in the drum of the pedal and into the respective through-holes defined in the respective side walls of the pedal housing, the pedal shaft being made of a first plastic material and including a bearing surface made of a second plastic material different than the first plastic material and adapted for abutting bearing contact with the interior surface of the drum of the pedal.

In one embodiment, the pedal shaft includes opposed ends defining respective keys and the respective through-holes in the respective side walls of the pedal housing define respective key holes adapted to receive the respective keys defined by the respective ends of the pedal shaft.

In one embodiment, each of the ends of the pedal shaft include tabs for press fitting the respective ends of the pedal shaft in the respective side walls of the pedal housing.

In one embodiment, the first plastic material of the pedal shaft is nylon and the second plastic material of the pedal shaft is Acetal.

The present invention is also directed to a vehicle pedal assembly comprising a stationary pedal shaft extending through a rotatable pedal, the pedal shaft being made of a first material and including an exterior surface made of a second material different than the first material and in contact with an interior surface of the pedal.

In one embodiment, the vehicle pedal assembly further comprises a pedal housing with opposed and spaced apart side walls defining respecting through-holes, the shaft including respective distal ends extending into and fixed in the respective through-holes defined in the respective side walls of the pedal housing.

In one embodiment, each of the through-holes has a first pattern and each of the distal ends of the shaft includes a second pattern that is complimentary with the first pattern of the respective through-holes defined in the pedal housing for locating the shaft relative to the pedal housing and preventing rotational movement of the shaft relative to the pedal housing.

In one embodiment, the first pattern of one or both of the through-holes in is the shape of a key-hole and the second pattern on one or both of the distal ends of the shaft is in the shape of a key adapted to be fitted in the key-hole defined by one or both of the through-holes in the pedal housing.

In one embodiment, the first material of the pedal shaft is nylon and the second material of the pedal shaft is Acetal.

In one embodiment, the pedal includes a distal drum defining the interior surface of the pedal in contact with the exterior surface of the pedal shaft.

There are other advantages and features of this invention which will be more readily apparent from the following detailed description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENT

Figure 1:
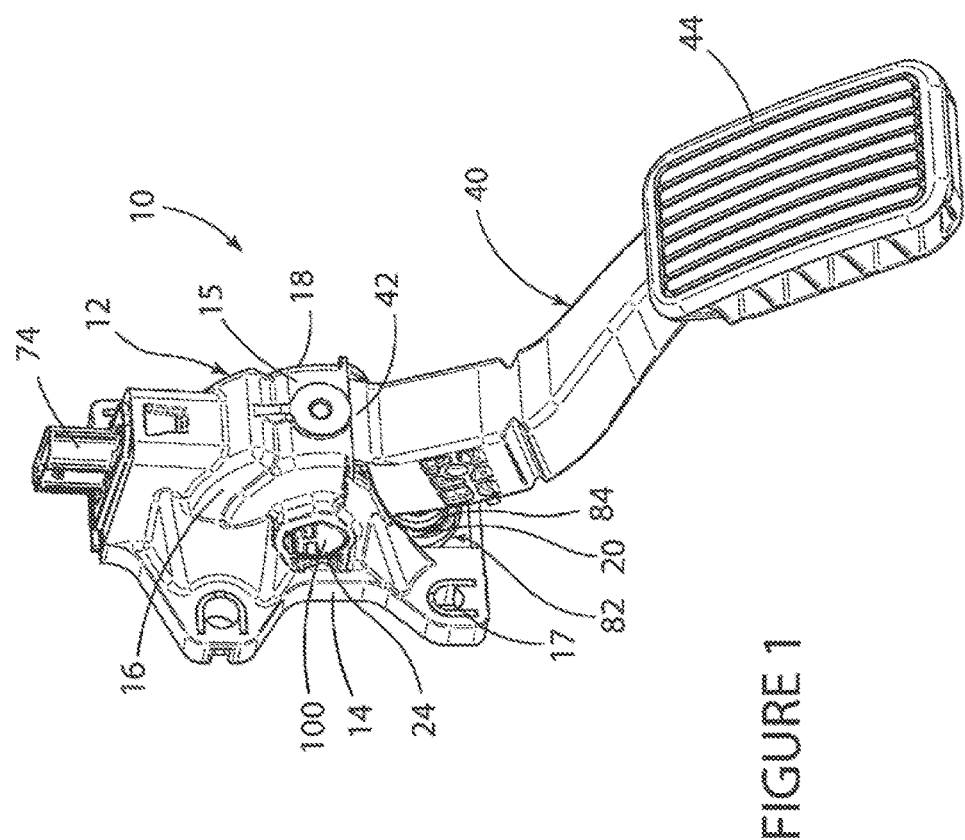
FIG. 1 is a perspective view of a vehicle pedal assembly incorporating a plastic pedal shaft in accordance with the present invention.
Figure 2:
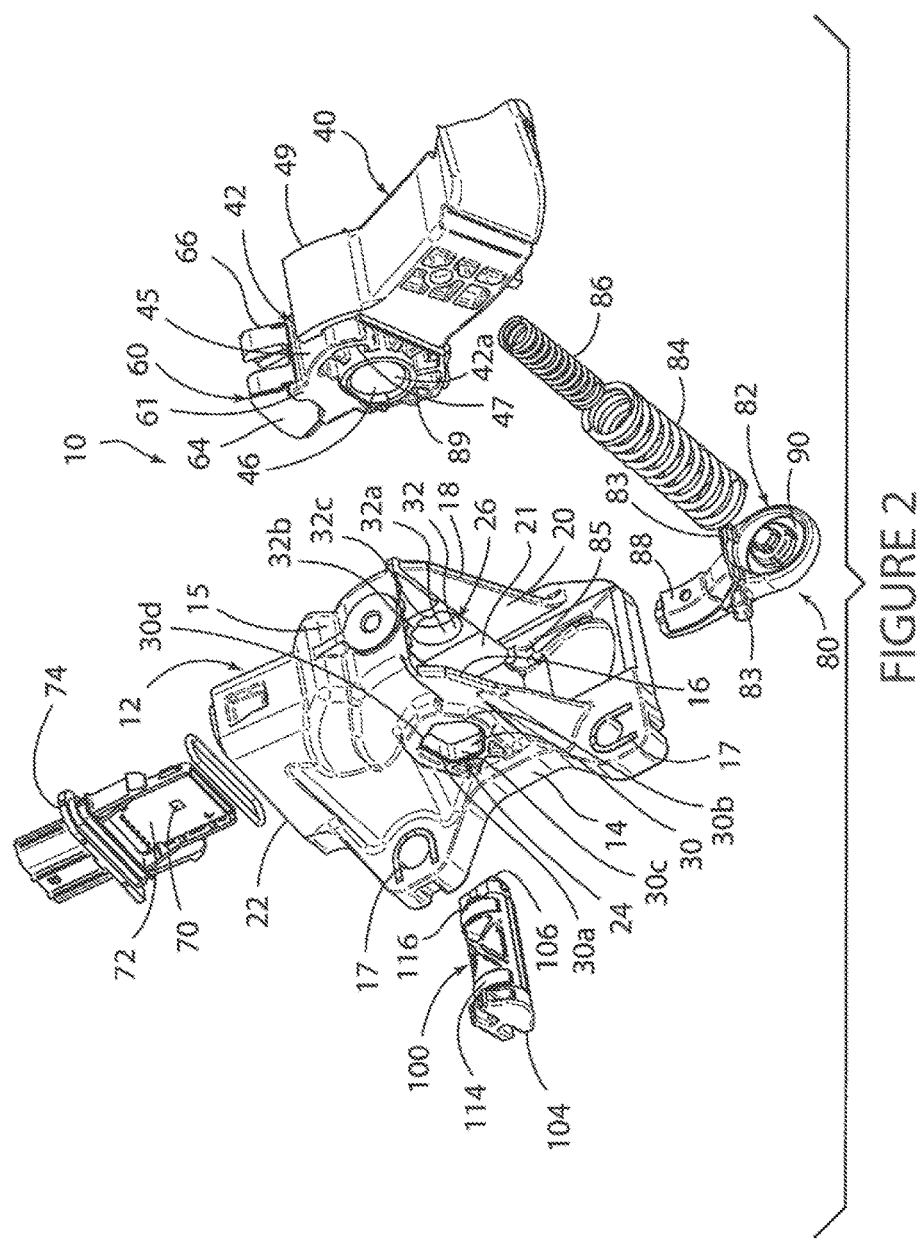
FIG. 2 is an exploded perspective view of the vehicle pedal assembly shown in FIG. 1.

FIGS. 1 and 2 depict an accelerator vehicle pedal assembly 10 incorporating a plastic pedal shaft 100 in accordance with the present invention.

The vehicle pedal assembly 10 is of the type shown and described in for example U.S. Pat. No. 7,404,342 to Wurn and US Patent Application Publication No. US2008/0276749A1 to Stewart, the disclosures and contents of which are expressly incorporated herein by reference and comprising a pedal housing 12 that is made of a suitable plastic material such as for example nylon and includes a generally flat base 14, a pair of spaced apart and parallel side walls 16 and 18 extending unitarily and normally outwardly from opposed longitudinally extending peripheral lower longitudinal edges of the base 14, and a top curved wall 15 extending unitarily between and normally outwardly from opposed longitudinal upper peripheral edges of the respective side walls 16 and 18 in a relationship spaced and opposed to the base 14, all together defining a front housing opening 20, an interior housing cavity 21, and a rear housing opening 22. The base 14 additionally defines a plurality of through-holes adapted to receive respective fastener inserts 17.

The housing side walls 16 and 18 include and define respective co-linearly aligned and diametrically opposed through-holes 24 and 26. In the embodiment as shown in FIG. 2, the through-hole 24 in the housing side wall 16 is defined by a circumferentially extending and multi (eight) sided interior surface 30 of the housing side wall 16 that, in the embodiment shown, includes a straight surface segment 30a, a curved concave surface segment 30b, another straight surface segment 30c, and a straight angled surface segment 30d.

In the embodiment shown, the surface segments 30a and 30b are opposed and spaced from each other with the concave surface segment 30b facing and converging in the direction of the straight surface segment 30a, and the segments 30c and 30d are opposed and spaced from each other and located between the respective ends of the segments 30a and 30b with the segment 30d angling and sloping away from the segment 30c. Further, and as shown in FIG. 3, the curved concave surface segment 30b includes a plurality of successive straight segments 30b1, 30b2, 30b3, 30b4, and 30b5 of varying length and all positioned and oriented at obtuse angles relative to each other.

Thus, in the embodiment shown, the through-hole 24 in the housing side wall 16 with the respective surface segments 30a, 30b, 30c, and 30d as described above is in the shape and form of a key hole having a first preselected shape/configuration/pattern.

Figure 3:
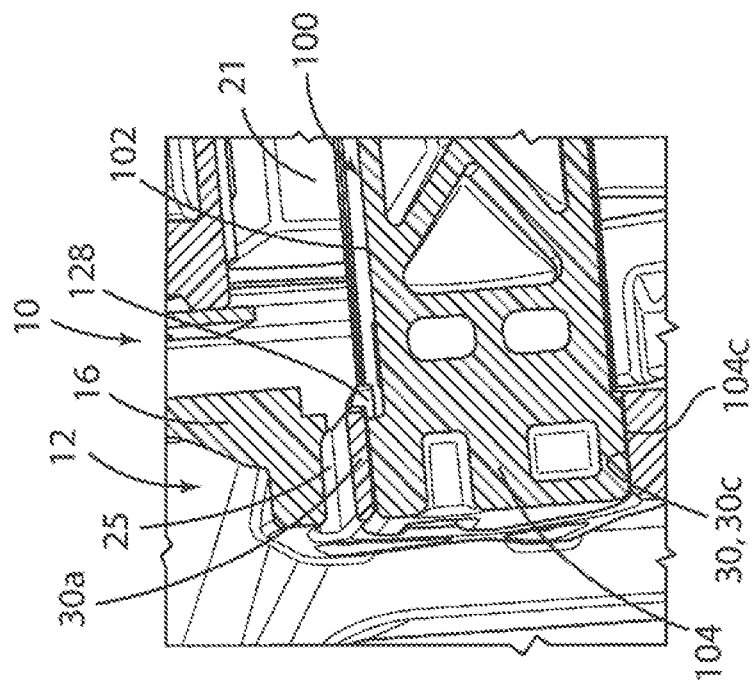
FIG. 3 is a broken side elevational view of the vehicle pedal assembly shown in FIG. 1 depicting the plastic pedal shaft secured in the pedal housing.

Referring to FIG. 3, the housing side wall 16 further defines another generally oval shaped through-hole 25 that is formed opposite and adjacent the straight surface segment 30a such that the straight surface segment 30a defines an elongate and flexible/bendable strip of the housing side wall 16 located between the through-holes 24 and 25 in the housing side wall 16.

In the embodiment shown, the through-hole 26 in the housing side wall 18 is defined by a circumferentially extending interior surface 32 of the housing side wall 18 that includes a curved semi-circular shaped surface segment 32a, an opposed straight surface segment 32b, and a recess or groove 32c defined in and extending into the wall 18 from the straight surface segment 32b. Thus, in the embodiment shown, the through-hole 28 in the housing side wall 18 with the respective segments 32a and 32b as described above is in the shape/configuration/pattern of a generally D shaped key hole having a second shape/configuration/pattern different than the shape/configuration/pattern of the key hole defined by the through-hole 24 defined in the housing side wall 16.

Still referring to FIGS. 1 and 2, the vehicle pedal assembly 10 further comprises an elongated pedal 40 that may be made of the same plastic material as the pedal housing 12 and includes a first distal end terminating in a generally cylindrical drum 42 and an opposite distal end terminating in a foot pad 44. The cylindrical drum 42 is located and retained for rotation in the interior housing cavity 21 and, as shown in FIG. 2, includes and defines a curved exterior surface 45, a pair of opposed and spaced apart sides 47 and 49, and a central through-hole 46 extending through the body of the drum 42 and terminating in respective openings in the opposed sides 47 and 49 of the drum 42.

The vehicle pedal assembly 10 still further comprises a non-contacting pedal position sensing assembly including a magnet 60 that is located in the interior housing cavity 21 and be press-fitted and secured to and extends outwardly from a pocket 61 defined in the front exterior surface 45 of the drum 42 of the pedal 40. In the embodiment shown, the magnet 60 is generally U-shaped and includes a pair of fan-shaped magnet pole pieces 64 and 66 secured to the exterior surface of the opposed fan-shaped side sections of the magnet 60.

The non-contacting pedal position sensing assembly further includes a sensor 70 mounted on a printed circuit board 72 located in the interior housing cavity 21. The printed circuit board 72 in turn is coupled to the end of an electrical connector 74 that is separate from and protrudes outwardly from the rear housing opening 22. The sensor 70 may be for example, of the Hall Effect type, and adapted to sense a change in the magnitude or direction of the magnetic flux generated by the magnet 62 in response to a change in the rotational position of the drum 42 and the pedal 40 relative to the pedal housing 12.

The vehicle pedal assembly 10 still further comprises a pedal friction or hysteresis assembly 80 including a pedal friction or hysteresis lever 82 and a pair of telescoping helical springs 84 and 86. The friction lever 82 includes a concave friction surface 88 at one distal end thereof adapted for engagement with a complimentarily shaped convex friction surface 89 on the exterior surface of the drum 42 of the pedal 40. A cup or receptacle 90 at the other distal end of the lever 82 receives the lower ends of the helical springs 84 and 86. The helical springs 84 and 86 are arranged in a telescopic configuration with the helical spring 86 extending through the interior of the helical spring 84 and with the pair of helical springs 84 and 86 positioned in a relationship with the lower ends thereof seated in the cup 90 of the friction lever 82 and the upper ends thereof abutted against the underside of the pedal 40.

The lever 82 also includes a pair of co-linear and diametrically opposed and spaced apart trunnions or pins 83 (FIG. 2) that project unitarily outwardly from the opposed exterior side surfaces of the lever 82 and are adapted to be received in respective diametrically opposed and spaced cheeks or recesses 85 (only one of which is shown in FIG. 2) defined in the pedal housing 12 and, more specifically, defined in the base 14 of the pedal housing 12 and, still more specifically, defined in the region of the base 14 of the pedal housing 12 adjacent the lower longitudinal edge of the respective side walls 16 and 18 unitary with the base 14.

The pins 83 define a teeter totter type pivot axis for the lever 82 relative and about the housing 12 and, more specifically, a pivot axis for the lever 82 relative and about the recesses 85 and, still more specifically, a pivot axis for the lever 82 relative and about the base 14 of the pedal housing 12. The pins 83 and the pivot axis defined by the pins 83 extend in a transverse direction normal to the direction of the longitudinal axis of the friction lever 82.

The vehicle pedal assembly 10 still further comprises the elongate and generally cylindrically shaped plastic pedal shaft 100 that is constructed and structured in accordance with the present invention as described in more detail below.

Figure 5:
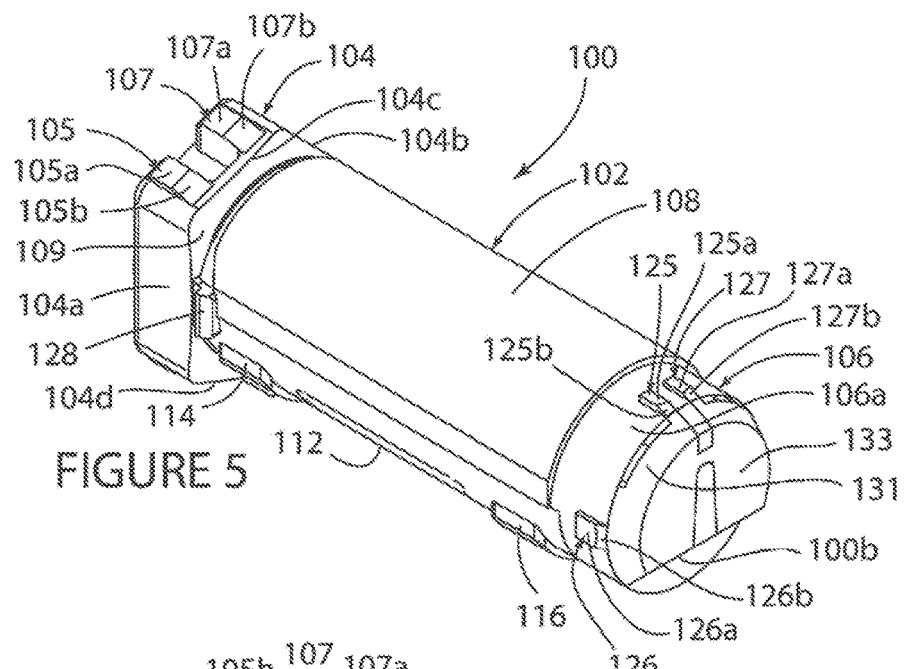
FIG. 5 is an enlarged perspective view of one side of the plastic pedal shaft in accordance with the present invention.
Figure 6:
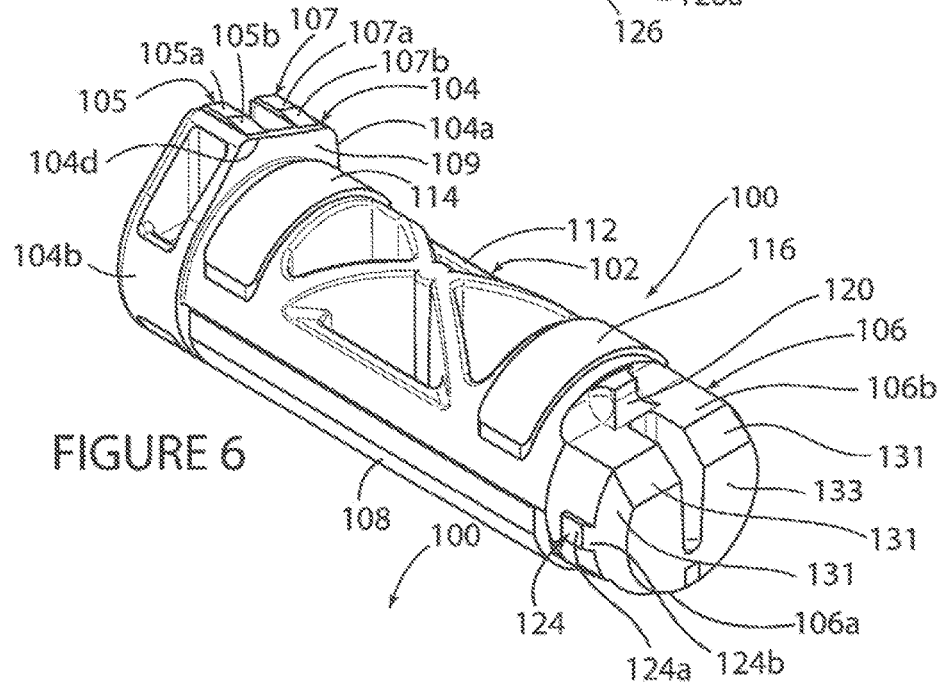
FIG. 6 is an enlarged perspective view of the other side of the plastic pedal shaft in accordance with the present invention.

Referring to FIGS. 2, 5, and 8, the pedal shaft 100 includes an elongate and generally cylindrically shaped body 102 with a circumferentially extending exterior surface and a pair of opposed distal ends 104 and 106. In accordance with the present invention, an expansive and generally rectangular shaped exterior curved central bearing surface or area 108 of the exterior surface of the body 102 of the shaft 100 is made of and includes an injection molded layer of plastic material that is unitary with and forms part of the body 102 of the shaft 100 but which is made of a plastic material that is different than the plastic material of the remainder of the exterior surface of the cylindrical surface of the cylindrical body 102 of the shaft 100.

In one embodiment, the shaft 100 is made of the same nylon plastic material as the pedal housing 12 and the pedal 40, and the exterior curved bearing surface or area 108 of the shaft 100 is made of a different plastic material such as for example Acetal (POM) that is formed as a unitary part of the shaft 102 via an injection molding process.

In the embodiment shown, the area or layer 108 envelops or covers approximately half or one hundred and eighty degrees (180°) of the circumferentially extending exterior surface of the central body 102 of the pedal shaft 100.

The cylindrical body 102 of the pedal shaft 100 further includes an exterior curved bearing surface or area that is diametrically opposed to the curved exterior bearing surface or area 108 and includes a central coring area 112 and a pair of bearing surfaces or areas or strips or layers 114 and 116 of injection molded plastic material defined at opposed ends of the central coring area 112 which are made of the same material as the bearing surface or area or layer of plastic material 108 and also formed as a unitary part of the shaft 102 via an injection molded process.

In the embodiment shown, the strips or layers 114 and 116 are diametrically opposed to each other on opposite sides of the central coring area 112; extend in a direction generally normal to the direction of the longitudinal axis of the shaft 100; and have a length greater than about ninety degrees (90°) of the exterior surface of the central body 102 of the pedal shaft 100. The strip 114 is located on the shaft body 102 between the coring area 112 and the distal end 104 of the shaft 100, and the strip 116 is located on the shaft body 102 between the coring area 112 and the distal end 106 of the shaft 100.

The one distal end 104 of the shaft 100 is in the form of a multi (eight) sided head having a shape/configuration/pattern corresponding to the shape/configuration/pattern of the multi (eight) sided interior surface 30 defining the through-hole 24 in the housing side wall 16 while the opposite distal end 106 of the shaft 100 has a two sided shape/configuration/pattern corresponding to the shape and configuration of the two sided interior surface 32 defining the through-hole 26 in the housing side wall 18.

More specifically, as shown in FIG. 3, the distal end or head 104 of the shaft 100 includes a straight exterior surface segment 104a, an exterior concavely curved surface segment 104b opposed and spaced from the segment 104a that curves and converges in the direction of the straight surface segment 104a, another straight exterior surface segment 104c, a straight angled exterior surface segment 104d opposed to and spaced from and angling and sloping away from the exterior straight surface segment 104c, and a central interior rib 104e that extends between the straight segment 104a and the curved surface segment 104b and forms a T with the straight segment 104a and defines a pair of co-linear and diametrically opposed recesses or grooves 104f and 104g in the head 104 of the shaft 100 that are located on opposed sides of the central rib 104e with the recess 104f located between the straight surface segment 104c and the rib 104e and the recess 104g located between the opposed straight surface segment 104d and the rib 104e.

Further, and as shown in FIG. 3, the exterior concavely curved surface segment 104b of the head 104 of the shaft 100 includes a plurality of successive straight segments 104b1, 104b2, 104b3, 104b4, and 104b5 of varying length and all positioned and oriented at obtuse angles relative to each other.

The respective exterior surface segments 104a, 104b, 104c, and 104d have the same shape/configuration/pattern as the corresponding housing side wall surface segments 30a, 30b, 30c, and 30d that define the through-hole 24 defined in the side wall 16 of the pedal housing 12 and thus the head of the shaft distal end 104 defines a key adapted to be fitted and extend through the key hole defined by the through-hole 24 in the side wall 16 of the pedal housing 12.

Each of the straight segments 104c and 104d of the exterior surface of the distal end 104 of the shaft 100 includes a pair of outwardly protruding spaced-apart, parallel, and diametrically opposed press-fitting/wedging/camming tabs 105 and 107 that extend in the same direction as the longitudinal axis of the shaft 100. Each of the tabs 105 includes a flat surface segment 105a and an angled camming surface segment 105b that slopes downwardly/inwardly from the flat surface segment 105a in the direction of the body 102 of the shaft 100. In a like manner, each of the tabs 107 includes a flat surface segment 107a and an angled camming surface segment 107b that slopes downwardly/inwardly from the flat surface segment 107a in the direction of the body 102 of the shaft 100.

The distal end or head 104 of the shaft 100 also includes and defines a shoulder 109 extending circumferentially radially outwardly from the exterior surface of the body 102 of the shaft 100. A clip tab 128 (FIGS. 4 and 5) projects outwardly from the exterior surface of the shoulder 109 and the body 102 in the region of the straight segment 104a of the distal end or head 104.

The opposed distal end 106 of the shaft 100 is generally D shaped and includes a curved and semi-circular exterior surface segment 106a and an opposed straight exterior surface segment 106b having the same shape/configuration/pattern as the D shape/configuration/pattern of the housing side wall surface segments 32a and 32b that define the through-hole 26 defined in the side wall 18 of the pedal housing 12 and thus the shaft distal end 106 likewise defines a key adapted to be fitted and extend through the key hole defined by the through hole 26 in the side wall 18 of the pedal housing 12.

The distal end 106 additionally includes and defines a pair of diametrically opposed press-fitting/wedging/camming tabs 124 and 126 that project and protrude outwardly from opposed sides of the shaft 100 and, more specifically, from diametrically opposed ends of the exterior surface of the curved and semi-circular exterior surface segment 106a of the distal end 106 of the shaft 100. The tabs 124 and 126 extend in the same direction as the longitudinal axis of the shaft 100 and each include respective flat exterior surface segments 124a and 126a and respective angled exterior camming surface segments 124b and 126b that slope downwardly/inwardly from the respective flat exterior surface segments 124a and 126a in the direction of the radial end face 133 of the distal end 106 of the shaft 100.

The distal end 106 further includes and defines a pair of diametrically opposed, spaced-apart, and parallel press-fitting/wedging/camming tabs 125 and 127 that project and protrude outwardly from the exterior surface of the curved and semi-circular exterior surface segment 106a of the distal end 106 of the shaft 100. The tabs 125 and 127 extend in the same direction as the longitudinal axis of the shaft 100 and each include respective flat exterior surface segments 125a and 127a and respective angled exterior camming surface segments 125b and 127b that slope downwardly/inwardly from the respective flat exterior surface segments 125a and 127a in the direction of the radial end face 133 of the distal end 106 of the shaft 100.

In the embodiment shown, the tabs 124; 125 and 127; and 126 are positioned at ninety degree (90°) intervals relative to each other.

The distal end 106 of the shaft 100 further includes and defines an end stop 120 protruding centrally outwardly from the exterior surface of the exterior straight surface segment 106b of the distal end 106 of the shaft 100.

The distal end 106 of the shaft 100 further includes and defines a circumferentially extending exterior camming surface 131 that is located and formed between the exterior surface segments 106a and 106b and the radial end face 133 and, more specifically, an angled camming surface 131 that slopes inwardly from the edge of the respective exterior surface segments 106a and 106b into the circumferentially extending peripheral edge of the radial end face 133 of the distal end 106 of the shaft 100.

The pedal shaft 100 as in the present invention and made of different materials as described above allows for the use of a low cost plastic shaft in applications where previously only a higher cost all metal pedal shaft would have been used.

The assembly of the vehicle pedal assembly 10 with the pedal shaft 100 in accordance with the present invention will now be described. Initially, the pedal 40 is inserted into the interior of the pedal housing 12 via and through the front opening 20 of the pedal housing 12 into a relationship wherein the through-hole 46 defined in the drum 42 of the pedal 40 is co-linearly aligned with the respective through-holes 24 and 26 defined in the respective side walls 16 and 18 of the pedal housing 12.

The shaft 100 is thereafter inserted into the pedal housing 12 and, more specifically the shaft distal end 106 is inserted and extended successively through the through-hole 24 defined in the housing side wall 16, the through-hole 46 in the drum 42 of the pedal 40 and into the through-hole 26 defined in the housing side wall 18 for mounting the pedal 40 for rotation in the housing 12 relative to both the shaft 100 and the pedal housing 12 in a relationship with the head 106 of the shaft 100 located in the through-hole 26 defined in the housing side wall 18, the body 102 of the shaft 100 extending through the through-hole 46 in the drum 42 of the pedal 40 and the head 104 of the shaft 100 located in the through-hole 24 defined in the housing side wall 16.

Figure 4:
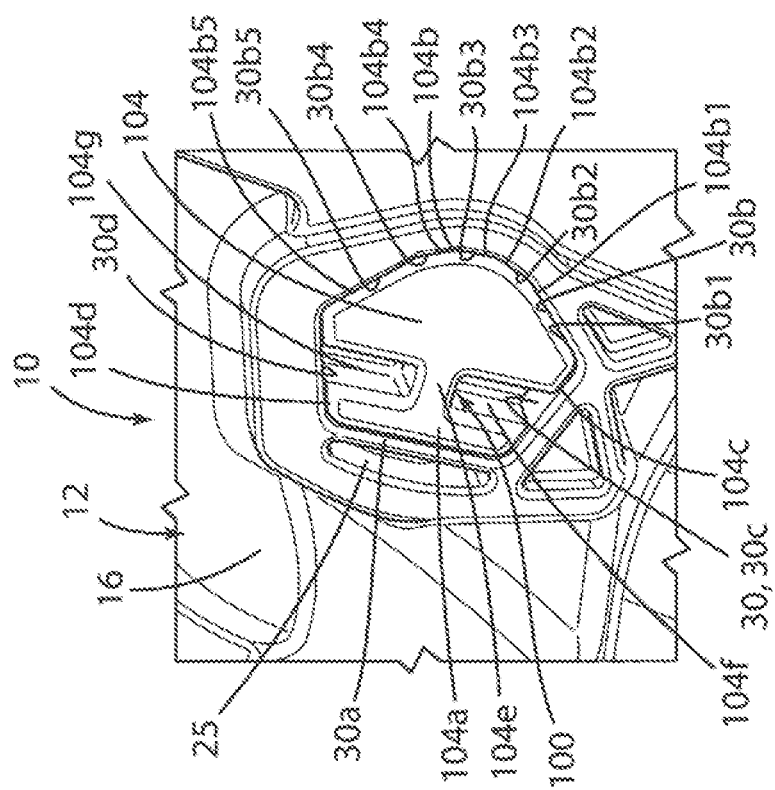
FIG. 4 is a broken vertical cross-sectional view of the vehicle pedal assembly shown in FIG. 1 depicting the plastic pedal shaft clipped to the pedal housing.

Moreover, during insertion of the shaft 100 into the pedal housing 12, the clip tab 128 comes into contact with the interior surface of the straight housing wall segment 30a which initially causes the outward flexing of the straight housing segment 30a and the inward flexing of the clip tab 128 followed by the outward flexing of the clip tab 128 when the clip tab 128 clears the end of the housing wall segment 30a following additional advancement of the shaft 100 into the housing 12 into the relationship as shown in FIG. 4 wherein a terminal shoulder on the clip tab 128 is abutted against the end face of the straight wall segment 30a thus securely retaining and preventing the removal of the shaft 100 from the pedal housing 12.

Still further, it is understood that the insertion tool grasping rib 104e and insertion tool receiving grooves 104f and 104g on the shaft head 104 are adapted to allow the shaft 104 and, more specifically the shaft head 104 and, still more specifically, the central rib 104e of the shaft head 104 to be grasped by the distal grasping fingers or prongs of a pliers or the like shaft insertion tool during insertion and assembly of the shaft 100 to and in the pedal housing 12.

In accordance with the invention, the exterior angled camming surface 131 on the distal end 106 of the shaft 100 advantageously guides the distal end 106 of the shaft 100 through the respective housing and drum through-holes during assembly. Further, during assembly, the respective tabs 124, 125, 126, and 127 on the distal end 106 of the shaft 100 are press-fitted and wedged into and against the interior surface that defines the through-hole 26 in the housing side wall 18 and the end stop 120 abuts against the housing side wall 18. In a like manner, the respective tabs 105 and 107 on the distal end 104 are press-fitted and wedged into and against the interior surface that defines the through-hole 24 in the housing side wall 16.

Thus, in accordance with the present invention, the key shaped ends 104 and 106 on the shaft 100 are fitted in and cooperate with the key hole shaped through-holes 24 and 26 in the respective housing side walls 16 and 18 to assure the proper rotational orientation and positioning of the shaft 100 in the interior of the housing 12 relative to the drum 42 of the pedal 40 during assembly. The press fit tabs 105 and 107 on the shaft distal end or head 104 and the press fit tabs 124, 125, 126, and 127 on the shaft distal end 106 provide for a secure press fit of the respective shaft ends 104 and 106 in the respective through-holes 24 and 26 in the respective housing side walls 16 and 18 and prevent rotation of the shaft 100 relative to the housing 12 during operation of the pedal assembly 10. Thus, in the embodiment shown, the shaft 100 is stationary and the pedal 40 rotates relative to the shaft 100 and the housing 12.

Moreover, the use of respective complementary curved surfaces 30b and 104b on the shaft head 104 and housing side wall surface 30 respectively, and more specifically the use of respective straight wall segments 30b1, 30b2, 30b3, 30b4, and 30b5 and 104b1, 104b2, 104b3, 104 b4, and 104b5 advantageously results in a reduction and more even distribution and transfer of stress from the shaft 100 to the housing side wall 16 and, more specifically, from the shaft head 104 to the housing side wall 16 in, for example, a pedal overload condition.

Still further in accordance with the present invention, the respective exterior curved bearing surfaces 108, 114, and 116 on the body 102 of the shaft 100 are adapted to abut against the interior bearing surface 42a defining the interior through-hole 46 of the drum 42 of the pedal 40. The use of the different material for the exterior bearing surfaces 108, 114, and 116 on the shaft 100 minimizes wear and unintended friction between the exterior surface of the shaft 100 and the interior surface defined by the through-hole 46 of the drum 42 of the pedal 40.

The connector assembly 74 is inserted into the pedal housing 12 via and through the rear housing opening 22 into a relationship with the printed circuit board 72 and the sensor 70 thereon extending and in the gap that is defined in the magnet 62.

The friction lever 82 is inserted into the pedal housing 12 through the front housing opening 20 into a relationship wherein the friction lever 82 is located between the drum 42 of the pedal 40 and the base 14 of the pedal housing 12 with the helical springs 84 and 86 wedged and extending between the underside of the pedal 40 and the receptacle 90 of the friction lever 82 and the respective pins 83 of the lever 82 received in the respective recesses 85 defined in the base 14 of the pedal housing 12.

The application of a downward force against the foot pad 44 causes the clockwise rotation of the pedal 40 and the drum 42 relative to the pedal housing 12 and the pedal shaft 100 which causes the compression of the helical springs 84 and 86 which in turn causes a teeter totter type pivoting of the friction lever 82 about the pins 83 and relative to the base 14 of the pedal housing 12 which in turn causes the friction pad 82 to exert a compressive frictional force against the exterior surface of the drum 42 of the pedal 40 which in turn transfers a hysteresis force to the pedal 40 and foot of the operator of the vehicle:

Rotation of the pedal 40 relative to the housing 12 also results in the rotation of the magnet 62 which in turn results in a change in the magnitude and direction of the magnetic flux generated by the magnet 62 that is sensed by the Hall Effect sensor 70 and allows detection and measurement of the position of the pedal 40 relative to the housing 12 thus allowing for the control of the acceleration and deceleration of the vehicle.

Numerous variations and modifications of the embodiment described above may be effected without departing from the spirit and scope of the novel features of the invention including for example the use of the shaft 100 of the present invention on other types of vehicle pedal assemblies including contacting position sensor type vehicle accelerator pedal assemblies.

It is to be further understood that no limitations with respect to the magnet assembly illustrated herein are intended or should be inferred. It is, of course, intended to cover by the appended claims all such modifications as fall within the scope of the claims.

What is claimed is:

1. A vehicle pedal assembly comp sing a stationary pedal shaft extending through a rotatable pedal, the stationary pedal shaft being made of a first material and including an exterior surface made of a second material different than the first material and in contact with an interior surface of the pedal, the first material of the stationary pedal shaft being nylon and the second material of the stationary pedal shaft being Acetal.

2. A vehicle accelerator pedal assembly comprising:
a pedal housing including a pair of spaced-apart side walls defining a pair of respective through-holes and an interior cavity;
a rotatable elongate pedal including a drum at one end extending into the interior cavity of the pedal housing and a foot plate at another end, the drum including an interior surface defining a through-hole; and
a stationary pedal shaft extending through the interior cavity of the pedal housing, the through-hole defined in the drum of the pedal and into the respective through-holes defined in the respective side walls of the pedal housing for mounting the pedal for rotation in the pedal housing relative to both the pedal shaft and the pedal housing, the pedal shaft being made of a first plastic material and including a bearing surface made of a second plastic material different than the first plastic material and adapted for abutting bearing contact with the interior surface of the drum of the pedal, wherein the pedal shaft includes opposed ends defining respective keys and the respective through-holes in the respective side walls of the pedal housing define respective key holes adapted to receive the respective keys defined by the respective ends of the pedal shaft, one of the respective side walls of the pedal housing including a flexible wall segment and one of the opposed ends of the pedal shaft including a flexible clip tab, the clip tab and the wall segment contacting and flexing in opposite directions when the one of the opposed ends of the pedal shaft is received in the key hole in the one of the respective side walls of the pedal housing.

3. The vehicle pedal assembly of claim 2, wherein one of the ends of the pedal shaft includes a curved surface segment including a plurality of successive exterior straight surface segments for transferring stress from the pedal shaft to respective straight wall segments in the side wall of the pedal housing.

4. A vehicle pedal assembly comprising:
a pedal housing including a pair of side walls defining a pair of respective through-holes;
a rotatable pedal including a drum extending into the pedal housing, the drum defining a through-hole; and
a stationary pedal shaft extending through the through-hole defined in the drum of the pedal and into the respective through-holes defined in the respective side walls of the pedal housing, the pedal shaft being made of a first plastic material and including a bearing surface made of a second plastic material different than the first plastic material and adapted for abutting bearing contact with the interior surface of the drum of the pedal, the first plastic material of the pedal shaft being nylon and the second plastic material of the pedal shaft being Acetal.

5. A vehicle pedal assembly comprising a stationary pedal shaft extending through a rotatable pedal, the stationary pedal shaft being made of a first material and including an exterior surface made of a second material different than the first material and in contact with an interior surface of the pedal, the vehicle pedal assembly further comprising a pedal housing with opposed and spaced apart side walls defining respective through-holes, the stationary pedal shaft including respective distal ends extending into and fixed in the respective through-holes defined in the respective side walls of the pedal housing, one of the distal ends of the stationary pedal shaft including a straight surface segment, an opposed curved surface segment, a central rib extending between the straight surface segment and the curved surface segment and forming a T with the straight surface segment, and a pair of grooves defined on opposite sides of the central rib and located between the straight surface segment and the curved surface segment.

6. The vehicle pedal assembly of claim 5, wherein each of the through-holes in the side walls of the pedal housing defines a key-hole and each of the distal ends of the stationary pedal shaft includes a key adapted to be fitted into the respective through-holes defined in the side walls of the pedal housing for locating the stationary pedal shaft relative to the pedal housing and preventing rotational movement of the stationary pedal shaft relative to the pedal housing.

* * * * *

UNITED STATES PATENT AND TRADEMARK OFFICE
CERTIFICATE OF CORRECTION

PATENT NO. : 9,684,331 B2
APPLICATION NO. : 14/877384
DATED : June 20, 2017
INVENTOR(S) : Thomas A. Hallberg Page 1 of 1

It is certified that error appears in the above-identified patent and that said Letters Patent is hereby corrected as shown below:

In the Claims

Column 9 (Line 26) Claim 1, Line 1, "comp sing" should be --comprising--

Signed and Sealed this
Tenth Day of April, 2018

Andrei Iancu
*Director of the United States Patent and Trademark Office*